United States Patent [19]

Kleine-Doepke et al.

[11] Patent Number: 4,721,648

[45] Date of Patent: Jan. 26, 1988

[54] METHOD FOR PRODUCTION OF COMPOSITE GLASS PANES AND ADHESIVE THEREFOR

[75] Inventors: Wolfgang Kleine-Doepke, Darmstadt; M. Reinhold Martin, Bad Koenig; Helmer Raedisch; Gerhard Holzer, both of Aachen, all of Fed. Rep. of Germany

[73] Assignee: Saint-Gobain Vitrage, Courbevoie, France

[21] Appl. No.: 877,346

[22] Filed: Jun. 23, 1986

[30] Foreign Application Priority Data

Jun. 28, 1985 [DE] Fed. Rep. of Germany ....... 3523140

[51] Int. Cl.$^4$ .............................................. B32B 7/12
[52] U.S. Cl. .................................... 428/317.7; 156/99; 156/275.5; 156/275.7; 156/333; 428/442; 522/33; 522/120; 525/257
[58] Field of Search ............. 525/257; 428/442, 317.2; 522/33, 120; 156/99, 333, 275.5, 275.7

[56] References Cited

U.S. PATENT DOCUMENTS

| | | | |
|---|---|---|---|
| 2,893,868 | 7/1959 | Barney | 522/120 |
| 3,167,598 | 1/1965 | Heaps et al. | 522/120 |
| 3,449,184 | 6/1969 | Balk | 156/99 |
| 3,471,356 | 10/1969 | Kolb et al. | 156/99 |
| 4,272,589 | 6/1981 | Dubois et al. | 156/99 |

FOREIGN PATENT DOCUMENTS

| | | |
|---|---|---|
| 0010355 | 6/1983 | European Pat. Off. . |
| 0108630 | 5/1984 | European Pat. Off. . |
| 0108631 | 5/1984 | European Pat. Off. . |
| 1016395 | 1/1966 | United Kingdom . |

*Primary Examiner*—John J. Gallagher
*Attorney, Agent, or Firm*—Oblon, Fisher, Spivak, McClelland & Maier

[57] ABSTRACT

For production of a composite glass pane from at least one silicate glass pane and at least one layer of a transparent plastics material, the plastics layer is glued to the glass pane by means of an UV-hardening adhesive. A homogeneous solution of photopolymerizable acrylic monomers (component A), a polymer (component B) and a photoinitiator (component C) is used as the adhesive, wherein the component (A) consists of a mixture of at least one $\alpha$, $\beta$-unsaturated carboxylic acid and at least one monofunctional $\alpha,\beta$-unsaturated carboxylic acid ester of an alcohol comprising 2 to 10 C-atoms, possibly comprising also oxygen atoms in the form of ether groups and/or hydroxyl groups, and component (B) consists of a polymer composed entirely or predominantly of vinyl chloride, which polymer is possibly after-chlorinated.

16 Claims, No Drawings

METHOD FOR PRODUCTION OF COMPOSITE GLASS PANES AND ADHESIVE THEREFORZ

BACKGROUND OF THE INVENTION

1. Field of the Invention

This invention relates to a method for the production of a composite glass pane of at least one silicate glass pane and at least one layer of a transparent plastics material, wherein the glass pane and the plastic layer are laid one upon the other with an adhesive layer placed between them, consisting of a homogeneous solution of photopolymerisable acrylic monomers (component A), a polymer (component B) and a photoinitiator (component C), and are subjected to an UV-irradiation for hardening the adhesive layer.

2. Background of the Prior Art

In one process of the general type described above, it is known to use a photopolymerisable adhesive, which contains an unsaturated ester prepolymer, an unsaturated monomer copolymerisable therewith, and a photoinitiator (FR-PS No. 20 01 985).

According to another known method, a photopolymerisable adhesive is used, which consists of acrylic acid and an aromatic ketone and optionally also contains a nitrogen-containing compound of the lactam type (DE-A No. 25 36 131).

UV-hardening adhesive systems for carrying out the method of this category are also known, which consist of prepolymers, such as those known in the industry by the term "urethane acrylates", and liquid acrylate thinners. As liquid thinners, for example, dimethyl aminoethyl methacrylate and acrylic acid (EP-A No. 10 355), or acrylic acid and monoesters of acrylic acid comprising 1 to 6 carbon atoms in the alcohol residue (EP-A Nos. 108 630 and 108 631) are used.

It has been found that, when these known UV-hardening adhesive systems are used, various difficulties occur. Thus, for example, the bonding of the adhesive to the silicate glass surface is not always adequate. Furthermore, in the use of PVC foils as transparent plastics, a clouding of these foils by contact with the adhesive has been observed.

SUMMARY OF THE INVENTION

The present invention has, as its object, to find and use adhesive compositions which are especially suitable for use in the named method for the production of composite glass panes, as considered from the most widely varied aspects. In particular, the adhesives used shall exhibit not only adequate bonding to the glass surface and also to the plastics surface and not give rise to any clouding of the plastics layer used, but shall moreover be composed of relatively inexpensive components and shall be suitable for gluing silicate glass panes to different transparent plastic materials.

According to the invention, this task is achieved in that, as the photopolymerisable adhesive, a solution is used, wherein the component (A) consists of a mixture of at least ($a_1$) one $\alpha$, $\beta$-unsaturated carboxylic acid and ($a_2$) at least one monofunctional $\alpha$, $\beta$-unsaturated carboxylic acid ester of an alcohol comprising 2 to 10 C-atoms, possibly comprising also oxygen atoms in the form of ether groups and/or hydroxyl groups, and the component (B) consists of a polymer composed entirely or predominantly of vinyl chloride, which polymer is optionally after-chlorinated. It has been found that the monomer-polymer systems according to this invention are eminently suitable for bonding of silicate glass panes to plastic layers of the widest variety of compositions. The composite glass panes produced by these adhesive systems possess good optical properties and an excellent bond between the glass pane and plastic layer. Particular importance is evidently attributable to component (B), which according to the present invention is a polymer composed entirely or at least predominantly of vinyl chloride.

DETAILED DESCRIPTION OF THE INVENTION

Silicate glass panes can be bonded to layers of polyvinyl chloride with particularly good success by means of the adhesive systems of this invention. Thus the adhesive is, for example, eminently suitable for making a composite glass pane from two silicate glass panes and a PVC foil disposed between them. It has, however, been found that also foils or plates of other transparent plastics, e.g. of polyesters such as polyethyleneterephthalate, polycarbonate, polymethylmethacrylate or cellulose acetobutyrate, can be bonded by means of the adhesive according to this invention with excellent results to silicate glass panes. The plastic layers do not necessarily need to be foils or plates, but light-diffusing insulating glass panes consisting of two glass panes and a foam-like plastic layer disposed between and bonded to them, as described in GM No. 84 26 326, may also be produced with the adhesive systems of this invention. The adhesive systems of this invention are also suitable for gluing a splinter-preventing foil, for example a polyester foil, onto the surface of a glass pane, it being possible for this polyester foil to be furnished for its part with a hard or a soft self-healing, scratch-proof coating.

The adhesive system of this invention advantageously possesses a proportioned composition of the individual components, wherein the ratio by wt. ($a_1$) : ($a_2$) of the photopolymerisable mixture constituents ($a_1$) and ($a_2$) in the solution is (2 to 30):(98 to 70), and wherein the ratio by wt. (A):(B):(C) of the components (A), (B) and (C) is (95 to 70):(5 to 30):(0.1 to 7).

If a foil of polyvinyl chloride or of a polymer which is composed substantially of polyvinyl chloride is to be used as the plastic layer, PVC foils are preferably used, which contain approximately 10 to 50% by wt. of solvent or plasticizer. Such plasticized PVC layers are less brittle and exhibit a higher flexibility, which is to the advantage of desirable properties in use of composite laminates. An example of an especially suitable PVC soft or plasticized foil is the product GUTTAGENA, transparent T 62 by the firm KALLE.

The photopolymerisable adhesive which is used for forming the adhesive layers in the composite glass is a homogeneous mixture, consisting of photopolymerisable acrylic monomers (A), a polymer (B) composed entirely or predominantly of vinyl chloride, and a photoinitiator (C).

As photopolymerisable acrylic monomers, at least two such monomers are present in the adhesive. The polymerisable compounds ($a_1$) are acrylic acid and/or methacrylic acid and ($a_2$) are esters of acrylic acid and/or methacrylic acid and alcohols comprising 2 to 10 C-atoms, which may contain also oxygen atoms in the form of ether groups and/or hydroxyl groups. The alcohol residue of the ester is derived from a linear or branched aliphatic or cycloaliphatic or araliphatic alcohol, which may also contain oxygen atoms in the form of ether groups and/or hydroxyl groups.

Examples of such esters of acrylic acid and methacrylic acid are: ethyl acrylate, isopropyl methacrylate, n-butyl acrylate, i-butylmethacrylate, n-hexylacrylate, n-hexylmethacrylate, 2-ethyl hexylmethacrylate, cyclohexyl acrylate, cyclohexyl methacrylate, 3,3,5-trimethyl cyclohexyl acrylate, 3,3,5-trimethyl cyclohexyl methacrylate, benzyl acrylate, benzylmethacrylate, 2-hydroxy ethyl acrylate, 2-hydroxy ethyl methacrylate, 2-hydroxy propylacrylate, 2-hydroxypropylmethacrylate, 2-hydroxy-3-chloropropylacrylate, 2-hydroxy-3-chloropropylmethacrylate, 4-hydroxybutylacrylate, 4-hydroxybutylmethacrylate, 5-hydroxypentylacrylate, 6-hydroxyhexylmethacrylate, and the etheric esters ethyl diglycol acrylate, ethyl triglycolacrylate, tetrahydrofurfuryl acrylate, tetrahydrofurfuryl methacrylate, phenoxyethylacrylate.

Preferred esters of acrylic acid and methacrylic acid are tetrahydofurfuryl acrylate, ethyl diglycol acrylate, 2-hydroxypropyl acrylate, 2-hydroxyethyl methacrylate, phenoxy ethyl acrylate.

The content of polymerisable acid ($a_1$) is smaller than the polymerisable ester content ($a_2$) in the polymerisable components of the adhesive layers. The ratio by wt. ($a_1$):($a_2$) can lie in the range (2 to 30):(98 to 70). The polymer component (B), present in the adhesive layers and therefore also in the adhesive of this invention, and composed entirely or predominantly of vinyl chloride, wherein the polymer may perhaps also be afterchlorinated, can, for example, be obtained as a commercial product, such as, for instance VINNOL E 15/45, a vinyl chloride-vinylacetate copolymer comprising 84% by wt. vinyl chloride component, i.e. with a chlorine content of 47 to 48% by wt., by the firm WackerChemie, or RHENOFLEX 63, an after-chlorinated PVC comprising 62 to approximately 65% by wt. chlorine, by the firm Dynamit-Nobel. The chlorine contents of the polymer components to be used according to this invention in the adhesive layer lie between 35 and 70% by wt. These polymers dissolve transparently in the acrylic monomers in the quantities to be used. The ratio by weight of the components (A):(B) can lie in the range of (95 to 70):(5 to 30).

As photoinitiators (C), there are suitable, for example, aromatic ketones of the type benzophenone, benzoin, benzil or quinones, such as anthraquinone derivatives. Amongst others, benzil dimethyl ketal, which is marketed under the name IRGACURE 651 as a product of the firm Ciba Geigy, has proved successful in the manufacture according to this invention of glass-PVC composites, as a photoinitiator in the formulation of the adhesive. Equally successful in use as a photoinitiator also, is the compound 2-hydroxy-2-methyl-1-phenyl-propane-1-on, which for example is commercially obtainable under the trade name DAROCURE 1173 as a product of the firm Merck. Depending upon the wavelength of the light to be used in photopolymerisation, other photoinitiators can be used, sometimes also several of them in combination. The quantity of initiator to be introduced into the adhesive is approximately 0.1 to 7% by wt. relative to the total weight of adhesive comprising (A)+(B)+(C).

Photopolymerisation is normally carried out at room temperature, i.e. at temperatures of about 10° to 35° C. As radiation sources, for example, fluorescent tubes may be used, which have emission maxima near to the initiator absorption wavelength, for example in the case of carbonyl compounds between 300 and 400 nm. The distance of the radiation sources from the objects to be irradiated is from a few cm to approximately 30 cm, and the exposure time is from 1 to 30 minutes. This time is dependent upon the wavelength of the light emitted and the power of the lamp.

The favourable process parameters of the method of this invention make possible continuous manufacture of glass-plastic composite glass panes.

Various examples of embodiment of the method of this invention are now described in detail below:

EXAMPLE 1

The production of a composite safety glass pane having the construction silicate glass pane/adhesive layer/plasticized PVC foil/adhesive layer/silicate glass pane, wherein the product GUTTAGENA transparent T62 is used as plasticized PVC foil, a transparent adhesive composition of 81.5% by wt. tetrahydrofurfuryl acrylate, 9% by wt. acrylic acid, i.e. with a weight ratio of virtually 9:1, with 9% by wt. of an afterchlorinated PVC comprising 60 to 62% by wt. chlorine (RHENOFLEX 63 by the firm Dynamid Nobel), and with 0.5% by wt. of a photoinitiator (IRGACURE 651 by the firm Ciba Geigy), is used. The laminated packet is subjected to a 10-minute irradiation with 40 watt/TLA 05 fluorescent tubes by Philips from an irradiation distance of 5 cm. The composite pane obtained exhibited good bond in all layers.

REFERENCE EXAMPLE

An adhesive composition comprising 47.5% by wt. tetrahydrofurfuryl acrylate, 5% by wt. acrylic acid, i.e. in a weight ratio of 9.5:1, 47% by wt. of an unsaturated, styrene-free polyester (PALATAL A 410 by the firm BASF) and 0.5% by wt. of a photoinitiator (IRGACURE 651 by the firm Ciba Geigy) and having the same viscosity as the adhesive composition in Example 1 gave, in an experiment for manufacturing a composite structure according to Example 1, a structure possessing inadequate bond.

EXAMPLE 2

A composite glass pane having the structure glass/adhesive layer/plasticized PVC foil (GUTTAGENA transparent T62)/adhesive layer/glass, is fabricated. The adhesive composition used consists of 81.5% by wt. tetrahydrofurfuryl acrylate, 9% by wt. acrylic acid, 9% by wt. of a vinyl chloride - vinyl acetate copolymer having a chlorine content of 47 to 48% by wt. (VINNOL E15/45M by the firm Dynamit Nobel), and 0.5% by wt. of a photoinitiator (IRGACURE 651). The adhesive layers are hardened by a 10-minute irradiation with 40 watt/TLA 05-fluorescent tubes by Philips from an irradiation distance of 5 cm. The adhesive possesses a good bond in all the layers.

EXAMPLE 3

A composite glass pane having the construction silicate glass pane/adhesive layer/plasticized PVC foil (GUTTAGENA transparent T62)/adhesive layer/silicate glass pane, is manufactured. As the adhesive layer, a solution of 49.1% by wt. of 2-tetrahyrofurfuryl acrylate, 27.3% ethyl diglycol acrylate, 9% acrylic acid, 13.6% of an afterchlorinated PVC comprising 60 to 62% by wt. chlorine (RHENOFLEX 63 by the firm Dynamit Nobel), and 1% of the photoinitiator IRGA- CURE 651 is used. The adhesive layers are hardened by 10-minute irradiation with 40 watt/TLA 0.5-fluorescent tubes by Philips from a distance of 5 cm. The composite structure shows that the adhesive formula according to this invention possesses good bond at both layers, namely to the glass and to the plasticized PVC.

EXAMPLE 4

A composite glass pane having the same construction as in example 3 is manufactured. As the adhesive layer, a solution of 49.1% by wt. of 2-tetrahydrofurfuryl acrylate, 27.3% 2-hydroxypropyl acrylate, 9% acrylic acid, 13.6% of an after-chlorinated PVC comprising 60 to 62% by wt. chlorine (RHENOFLEX by the firm Dynamit Nobel), and 1% of the photoinitiator IRGACURE 651 is used. The adhesive layers are hardened by a 10-minute irradiation with 40 watt/TLA 05-fluorescent tubes by Philips, from an irradiation distance of 5 cm. The composite structure shows that the adhesive formula according to this invention possesses a good bond at both layers, namely to the glass and to the plasticized PVC foil.

EXAMPLE 5

For the fabrication of a composite glass pane having the construction described in Examples 3 and 4, an adhesive composition of 49.1% by wt. of 2-tetrahydrofurfuryl acrylate, 27.3% phenoxy ethyl acrylate, 9% acrylic acid, 13.6% of an after-chlorinated PVC comprising 60 to 62% by wt. chlorine (RHENOFLEX 63 by the firm Dynamit Nobel) and 1% of the photoinitiator IRGACURE 651 is used. The adhesive layers are hardened by 10-minute irradiation with 40 watt/TLA 05-fluorescent tubes by Philips from an irradiation distance of 5 cm. The composite structure showed that the adhesive formula according to this invention possesses good bond to both layers, namely to the glass and to the plasticized PVC foil.

EXAMPLE 6

A composite glass pane having the construction silicate glass pane/adhesive layer/acrylic glass pane/adhesive layer/silicate glass pane is manufactured. For the acrylic glass pane, a 1.5 mm thick plate of the consists of a homogeneous solution of 81.5% tetrahydrofurfuryl acrylate, 9% by wt. acrylic acid, i.e. in a weight ratio of virtually 9:1, 9% by wt. of an after-chlorinated PVC comprising 60 to 62% by wt. chlorine (RHENOFLEX 63 by the firm Dynamit Nobel), and 0.5% by wt. of a photoinitiator (IRGACURE 651 by the firm Ciba Geigy). The adhesive layers are hardened by a 10-minute irradiation with 40 watt/TLA 05-fluorescent tubes by Philips, from an irradiation distance of 5 cm. The photo-polymerisable adhesive exhibits good bonding at all layers.

EXAMPLE 7

A composite glass pane having the construction silicate glass pane/adhesive layer/polycarbonate plate is manufactured. For the polycarbonate plate, an 0.25 mm thick plate, coated on one face with PMMA, is used, as is commercially obtainable under the trade name LEXAN 8C20-112 from the firm GENERAL ELECTRIC. This polycarbonate plate is glued to the silicate glass pane on the side coated with PMMA. The adhesive used consists of a homogeneous solution of 81.5% by wt. tetrahyrofurfuryl acrylate, 9% by wt. acrylic acid, i.e. in a weight ratio of virtually 9:1, 9% by wt. of an after-chlorinated PVC comprising 60 to 62% by wt. chlorine (RHENOFLEX 63 by the firm Dynamit Nobel) and 0.5% by wt. of a photoinitiator (IRGACURE 651 by the firm Ciba Geigy). The adhesive layers are hardened by a 10-minute irradiation with 40 watt/TLA 0.5 fluorescent tubes by Philips, from an irradiation distance of 5 cm. The adhesive shows a good bonding at all layers.

EXAMPLE 8

A thermally insulating composite glass pane having safety glass properties is to be fabricated, consisting of two outer silicate glass panes and a plate of transparent, foamed polymethyl methacrylate located between and glued to these panes. For the silicate glass panes, 2 mm thick float glass panes are used, and for the plate of foamed PMMA, a 16 mm thick plate of the product IMACRYL-FOAM by the firm JMC Acrylguss GmbH are used. The layers are connected to one another by means of an adhesive, which consists of an homogeneous solution of 81.5% by wt. tetrahydrofurfuryl acrylate, 9% by wt. acrylic acid, i.e. in a weight ratio of virtually 9:1, 9% by wt. of an after-chlorinated PVC comprising 60 to 62% by wt. chlorine (RHENOFLEX 63 by the firm Dynamit Nobel) and 0.5% by wt. of a photoinitiator (IRGACURE 651 by the firm Ciba Geigy). The adhesive layers are hardened by 10-minute irradiation with 40 watt/TLA 05-fluorescent tubes by Philips from an irradiation distance of 5 cm. The adhesive layer exhibits a good bond to all layers, and the composite glass obtained not only possesses safety glass properties, but moreover has excellent thermally insulating properties.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Method for the production of a composite glass pane from at least one silicate glass pane and at least one layer of a transparent plastic material, comprising placing the glass pane and the plastics layer one upon the other with an adhesive layer between them consisting of a homogeneous solution of photopolymerisable acrylic monomers (component A), a polymer (component B) and a photoinitiator (component C), and subjecting the resulting article to a UV-irradiation for hardening the adhesive layer, wherein component (A) consists of a mixture of at least ($a_1$) one $\alpha, \beta$-unsaturated carboxylic acid and
($a_2$) at least one monofunctional $\alpha, \beta$-unsaturated carboxylic acid ester, of an alcohol comprising 2 to 10 C-atoms, and component (B) consists of
polyvinylchloride or vinylchloride-vinylacetate copolymer consisting predominantly of vinyl chloride, which optionally is after-chlorinated.

2. The method of claim 1, wherein said ester ($a_2$) comprises oxygen atoms in the form of ether and/or hydroxyl groups.

3. Method according to claim 1, wherein the polymerisable components ($a_1$) and ($a_2$) are contained in the adhesive layer in a ratio by wt. ($a_1$):($a_2$)=(2 to 30):(98 to 70).

4. Method according to claim 1, wherein in the adhesive layer, the ratio by wt. has the value (A):(B):(C)=(95 to 70):(5 to 30):(0.1 to 7).

5. Method according to claim 1, wherein the α, β-unsaturated carboxylic acid is acrylic acid, methacrylic acid and mixtures thereof.

6. Method according to claim 1, wherein the α, β-unsaturated carboxylic acid ester is an ester of an acid selected from the group consisting of the acrylic acid, methacrylic acid and mixtures thereof.

7. Method according to claim 1, wherein the α, β-unsaturated ester is a hydroxy alkyl ester.

8. Method according to claim 1, wherein the α, β-unsaturated carboxylic acid ester is 2-hydroxy propyl acrylate.

9. Method according to claim 1, wherein the α, β-unsaturated ester is an alkoxy alkyl ester, an aryloxy alkyl ester or mixture thereof.

10. Method according to claim 1, wherein the α, β-unsaturated carboxylic acid ester is tetrahydrofurfuryl acrylate.

11. Method according to claim 1, wherein the polymer (B) is after-chlorinated PVC.

12. Method according to claim 1, wherein the polymer (B) is a vinyl chloride - vinyl acetate copolymer.

13. Photopolymerisable adhesive for the production of a transparent glass-plastic composite, consisting of a monomer (A) - polymer (B) - solution comprising photoinitiator (C), wherein the monomer component (A) is a mixture of at least (a$_1$) one α, β-unsaturated carboxylic acid and (a$_2$) at least one monofunctional α, β-unsaturated carboxylic acid ester of an alcohol comprising 2 to 8 C-atoms, in a weight ratio of (a$_1$):(a$_2$)=(2 to 30):(98 to 70), and the polymer (B) consists of polyvinylchloride or vinylchloride-vinylacetate copolymer consisting predominantly of vinyl chloride and may optionally be after-chlorinated, and the weight ratio of the components (A):(B):(C)=(95 to 70):(5 to 30):(0.5 to 7).

14. The adhesive of claim 13, wherein the ester (a$_2$) comprises oxygen atoms in the form of ether groups, hydroxyl groups, or both.

15. A composite glass pane comprising two silicate glass panes and a transpaarent foil or plate of plasticized polyvinyl chloride disposed between them and bonded to them by use of the adhesive of claim 13.

16. A thermally insulating composite glass pane comprising two silicate glass panes and a transparent plate of foamed polymethylmethacrylate disposed between them and bonded to them by use of the adhesive of claim 14.

* * * * *